Sept. 7, 1943.　　　M. MAAG　　　2,329,067
GAUGE
Filed July 2, 1940　　　2 Sheets-Sheet 1
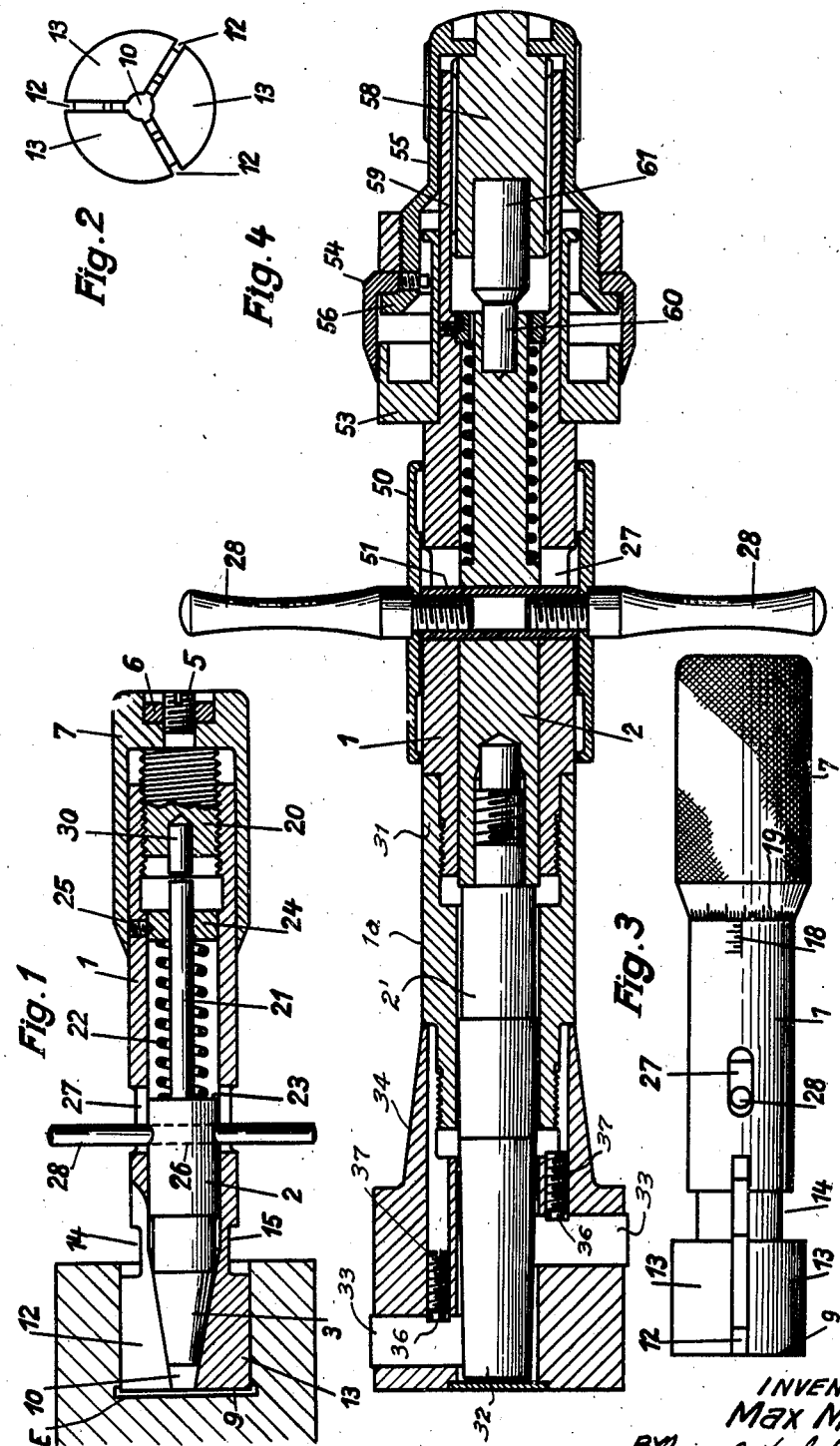
INVENTOR
Max Maag
BY Joseph F. Schofield
ATTORNEY Sept. 7, 1943.　　　　　M. MAAG　　　　　2,329,067
GAUGE
Filed July 2, 1940　　　　2 Sheets-Sheet 2
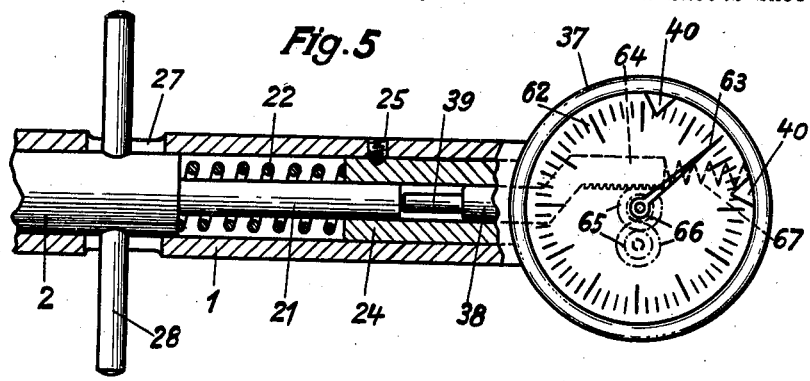
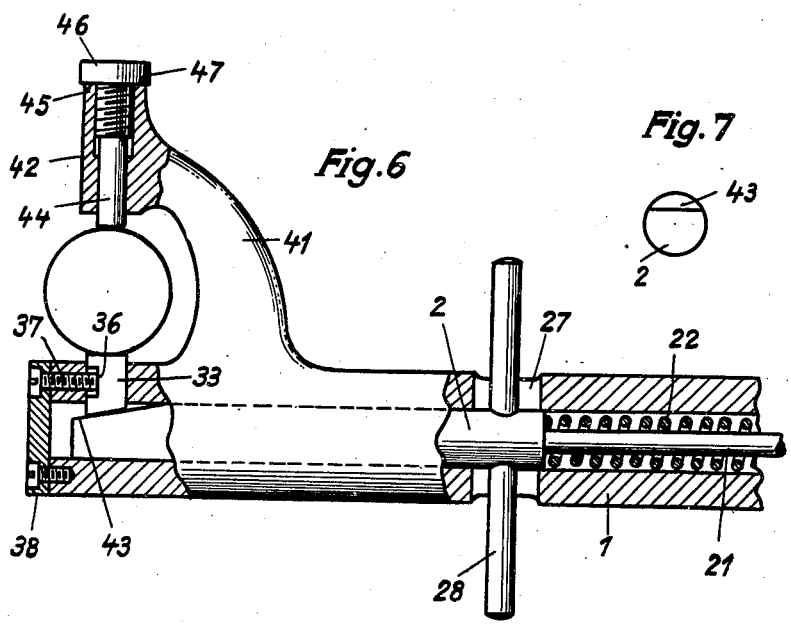
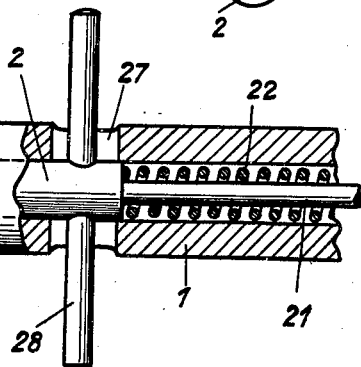
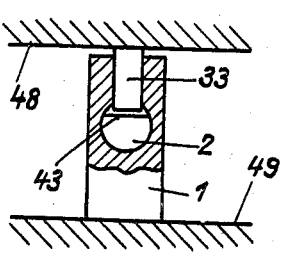
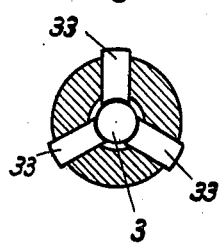
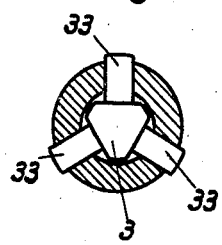
INVENTOR
Max Maag
BY Joseph K. Schofield
ATTORNEY Patented Sept. 7, 1943

2,329,067

UNITED STATES PATENT OFFICE 2,329,067

GAUGE

Max Maag, Zurich, Switzerland

Application July 2, 1940, Serial No. 343,627
In Switzerland November 25, 1939

3 Claims. (Cl. 33—178)

The invention relates to gauges and measuring instruments and more particularly to gauges for measuring inaccuracies in work pieces.

One object of the invention is to provide an adjustable gauge which is particularly adapted to measure bores and diameters of cylindrical workpieces. A further object of the invention consists in the provision of an adjustable gauge of the type aforesaid which permits the measuring under unvariable conditions the pressure by which the gauging elements are pressed on to the workpiece is the same in a given gauge and equals a predetermined magnitude.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the appended claims.

In the drawings:

Fig. 1 shows in a diagrammatical manner an adjustable internal gauge in sectional elevation.

Fig. 2 is a front elevation.

Fig. 3 is a side elevation thereof.

Figs. 4, 5 and 6 illustrate each in an axial section part of a further embodiment of the invention.

Fig. 7 is a face view of the pressbar of the gauge shown in Fig. 6.

Fig. 8 illustrates in sectional elevation and in a diagrammatical manner the gauging member and its adjusting bar of an internal gauge.

Figs. 9 and 10 show different gauging members with the co-operating setting rods in front view.

The adjustable internal gauge shown in Figs. 1 to 3 comprises a cylindrical casing 1 having a bore in which a rod 2 is slidably mounted. The casing 1 is provided with a head 9 with a conical bore 10 into which projects the conical endpiece 3 of the rod 2. The end piece 3 fits exactly in the bore 10. Between the body of the casing 1 and the head 9 there is an annular groove 14. Three radial slots 12 divide the head in three springy jaws 13. The head 9 may be expanded by pressing the conical end piece 3 of rod 2 into the bore 10. In a cross bore 26 of the rod 2 a pin 28 is fixed, the ends of which project through two slots 27 of the casing 1. The rod 2 has an extension 21 which is guided in a disk 24. This disk 24 is held by a set screw 25 arranged in the wall of the casing 1. Between the shoulder 23 and the said disk 24 a coiled spring 22 is arranged, pressing the conical endpiece 3 into the conical bore 10 of the head 9. The hind end of casing 1 is provided with internal screw threads. A cap 7 is slidably and rotatably mounted on the casing 1 and is provided with a screw threaded bolt 20 secured in the cap by a screw 5 and a nut 6. The bolt 20 engages the threads of the casing 1. By turning the cap 7 the latter is moved in axial direction and a pin 30 fixed to said bolt 20 is brought in touch with the face of the extension 21. The position of the said face with reference to the casing 1 may be read off by scales 18, 19 in the well known manner.

The gauge is used to take fine measurements. The hand of the workman holding the casing 1 withdraws the rod against the action of the spring 22. The conical endpiece 3 frees the jaws 13 which owing to the elasticity of their groove portions move inwardly. The head 9 is inserted in the bore of the work piece 17 and the rod 2 released. The endpiece 3 presses the jaws 12 apart under the action of the expanding spring 22. The jaws 12 are pressed always with the same force on to the inner wall 16 of the work piece 17, the measurements which are normally within a few hundredths of an inch are therefore very reliable. The sleeve 7 is now turned until the feeler 30 abuts on the face of the rod extension 21. The scales 18, 19 show the diameter of the bore 16. The distance which the rod 2 moves while taking the measure is comparatively very great and is always a multiple of the distance moved by the gauging jaws 13.

In Fig. 4 another practical embodiment of the invention is shown. To the casing 1 a tubular extension member 31 is screwed, carrying a head 34. The head 34 is screwed into the casing 31 so that it may be replaced by another head with other dimensions. A number of angularly and axially spaced gauging bolts 33 are slidably arranged in radial bores of the head 34, the bolts are distributed evenly over the whole head. Each bolt 33 is provided with a lateral groove 36 into which the end of a set screw 37 projects securing the bolt in its bore. The inner faces of the bolts 33 are curved as shown in Fig. 9. They rest with the whole face on the cone 3. The rod comprises several sections 2, 32 and 2', screwed together, the whole length of the rod sections corresponds to the total length of the casing sections. Extension members 1', 2', of any suitable length may be used in combination with the same parts 1 and 2.

To prevent dirt and chips to enter the slot 27 a sleeve 50 is slidably mounted on the casing 1. The sleeve 50 is fixed with the pins 28 to a bushing 51 fixed to rod 2 and slidably guided in the slot 27. The scale 18 is placed on a sleeve 53 which is fastened to the casing 1. On a tubular extension 59 of the casing 1 a sleeve 55 is mounted which is rotatably and axially displaceable. An annular member 54 carrying the scale 19 is rotatably adjustable on the sleeve 55 and may be clamped in any rotative position thereon by the means shown in Fig. 4, the rim of the member 54 projects over the rim of the sleeve 53. The sleeve 55 is secured to the bolt 58 as by means shown in Fig. 1 to secure sleeve 7 to bolt 20. This bolt is screw-threaded and engages the screw-threaded portion 59 of the extension 59 of the casing 1. By turning the sleeve 55 the bolt 58 is displaced in axial direction. Both the rod 2 and the bolt 58 are provided respectively with pins 60 and 61, for instance of hardened steel and so on. The pins 60 and 61 abut on each other when the measurment is to be taken.

The gauge is used as described with reference to Figs. 1 and 2.

As shown in Fig. 5 the means to read off the result of the measurement may include a dial 62 over which a pointer 63 is running. The feeler rod 38 is provided with a rack 64 engaging a pinion 65 of the toothed gearing 66 which turns the pointer 63. A spring 67 acts on the rack 64. The spring tends to keep the feeler rod 38 in engagement with the rod 21. The pointer 63 shows the result automatically on the dial 62. All the parts are arranged in a housing fixed on the casing 1.

As shown in Figs. 6 and 7 the adjusting gauge may be constructed to take outside measures of the workpiece. The casing 1 is provided with an arm 41 extending sidewardly from the casing 1. At the free end of the arm 41 a gauging member 44 is adjustably arranged in a sleeve portion 42 of said arm by means of a set screw 46 with head 47. The head 47 of the set screw 46 is closely screwed on the upper face 45 of the said sleeve 42. In the casing 1 gauging member 33 is slidably arranged in the bore running coaxially with the gauging member 44. The member 33 is secured against loss by the set screw 37 engaging the groove 36 of the gauge 33. The latter rests on the slanting face 43 of the rod 2. The bore is closed by the disk 38. To take a measurement the rod 2 is withdrawn by the handles 28 against the action of spring 22 and is then released when the gauging members 33, 44 are in proper position on the work piece. Any suitable registering device may be used.

A rod with the slanting face 43 may also be used in gauges taking internal measures, as shown in Fig. 8. The casing 1 is placed on the one wall 49 while the gauging member 33 is pressed on the face 48 by the spring 22, as described above.

In Figs. 9 and 10 different shapes of the conical or slanting portions of the rod 2 are shown by way of examples. The inner faces of the gauging member 33 conform to the configuration of the conical or slanting portions of the rod 2. The gauging member 33 rest with the whole face on the slanting or adjusting piece.

What I wish to secure by U. S. Letters Patent is:

1. An adjustable gauge comprising in combination, a casing having an axial bore therein, a rod slidable within said bore, said rod having a conical inner end, an abutment at the opposite end thereof, axially spaced sets of guideways in said casing, each guideway extending radially relatively to said bore, gauging members slidably mounted in said guideways and engaging said rod at axially spaced points on the conical surface adjacent its end, a spring acting on said rod in one direction, and means movable against said abutment when said rod is in gauging position to indicate the position of said rod in said bore.

2. An adjustable gauge comprising in combination, a casing having an axial bore therein, a rod slidable within said bore, said rod having a conical inner end, an abutment at the opposite end thereof, axially spaced sets of guideways in said casing, each guideway extending radially relatively to said bore, a gauging member slidably mounted in each of said guideways and engaging said rod on the conical surface adjacent its end, a spring acting on said rod in a direction to force said gauging members outwardly, and indicating means movable against said abutment when said rod is in gauging position to indicate the position of said rod in said bore.

3. An adjustable gauge comprising in combination, a casing having an axial bore therein, a rod slidable within said bore, said rod having a conical inner end, an abutment at the opposite end thereof, axially spaced sets of guideways in said casing, each guideway extending radially relatively to said bore, a gauging member slidably mounted in each guideway and engaging said rod, the gauging members for the different sets of guideways engaging said rod at axially spaced points on the conical surface adjacent its end, a spring acting on said rod in a direction to force said gauging members radlly outward, and means movable against said abutment when said rod is in gauging position to indicate the position of said rod in said bore.

MAX MAAG.